United States Patent [19]
Tsutsumi et al.

[11] Patent Number: 6,031,019
[45] Date of Patent: Feb. 29, 2000

[54] AQUEOUS INK FOR INK-JET PRINTING

[75] Inventors: Takehiro Tsutsumi; Koji Azuma; Michitaka Sawada, all of Wakayama-ken; Tadashi Sakuma, Tochigi-ken; Kenji Kaida, Tochigi-ken; Shigemi Wakabayashi, Tochigi-ken; Tetsuya Ueno; Kuniyasu Kawabe, both of Wakayama-ken, all of Japan

[73] Assignee: Kao Corporation, Tokyo, Japan

[21] Appl. No.: 09/018,844

[22] Filed: Feb. 4, 1998

[30] Foreign Application Priority Data

Feb. 7, 1997 [JP] Japan .................................. 9-024679
Apr. 11, 1997 [JP] Japan .................................. 9-094240

[51] Int. Cl.⁷ .......................... C09D 11/02; C09D 11/10; C08F 283/12; C08F 30/08; C08F 230/08
[52] U.S. Cl. ...................... 523/160; 526/279; 526/307.5; 526/307.7; 525/312; 525/479
[58] Field of Search ...................... 523/160, 161; 106/31.13, 31.25, 31.27, 31.32, 31.33, 31.57; 525/479, 279, 312, 287, 309, 475; 526/307.5, 307.7, 276, 279

[56] References Cited

U.S. PATENT DOCUMENTS

| | | | |
|---|---|---|---|
| 4,471,079 | 9/1984 | Enami ...................................... | 523/161 |
| 4,692,188 | 9/1987 | Ober et al. ............................... | 523/300 |
| 4,963,189 | 10/1990 | Hindagolla . | |
| 4,981,902 | 1/1991 | Mitra et al. .............................. | 324/547 |
| 5,017,224 | 5/1991 | Tomita et al. ........................ | 106/31.43 |
| 5,166,276 | 11/1992 | Hayama et al. ..................... | 525/329.7 |
| 5,205,862 | 4/1993 | Kiyomoto et al. ................... | 106/31.47 |
| 5,428,101 | 6/1995 | Urano et al. ............................ | 524/521 |
| 5,431,722 | 7/1995 | Yamashita et al. .................. | 106/31.43 |
| 5,594,067 | 1/1997 | Doi et al. ................................. | 524/806 |
| 5,679,143 | 10/1997 | Looman ............................... | 106/31.43 |
| 5,734,403 | 3/1998 | Suga et al. .............................. | 347/101 |
| 5,833,744 | 11/1998 | Breton et al. ........................ | 106/31.59 |
| 5,837,754 | 11/1998 | Shimomura et al. .................. | 523/161 |
| 5,852,074 | 12/1998 | Tsutsumi et al. ....................... | 523/161 |

FOREIGN PATENT DOCUMENTS

| | | |
|---|---|---|
| 55-18412 | 2/1980 | Japan . |
| 59-30873 | 2/1984 | Japan . |
| 3-250069 | 11/1991 | Japan . |
| 4-28776 | 1/1992 | Japan . |
| 4-189876 | 7/1992 | Japan . |
| 4-261478 | 9/1992 | Japan . |
| 4-359071 | 12/1992 | Japan . |
| 4-359072 | 12/1992 | Japan . |
| 6-340835 | 12/1994 | Japan . |

*Primary Examiner*—Vasu Jagannathan
*Assistant Examiner*—Callie E. Shosho
*Attorney, Agent, or Firm*—Oblon, Spivak, McClelland, Maier & Neustadt, P.C.

[57] ABSTRACT

Aqueous ink for ink-jet printing comprises an emulsion of fine polymer particles and contains at least one compound selected from an amino acid or a salt thereof and the like.

14 Claims, No Drawings

AQUEOUS INK FOR INK-JET PRINTING

BACKGROUND OF THE INVENTION

The present invention relates to an aqueous ink for ink-jet printing which provides prints having excellent waterfastness and exhibits improvements in print density, ink dispersion stability, ink ejection stability and anti-clogging properties of the ink, and scratch resistance of printings.

Ink-jet printing is a non impact printing system in which ink droplets ejected from very small nozzles are directly adhered to a recording medium to form an image. Widespread ink-jet printing systems include a piezoelectric system applying a piezoelectric element to a printing head and a thermal-jet system utilizing the heating of a electrical resistive element. Ink developed for use in these systems generally comprises a water-soluble dye and a polyhydric alcohol as a wetting agent for the purpose of preventing clogging the nozzles. However, it has poor wvaterfastness. In particular, when used in a thermal-jet system, the water-soluble dye undergoes oxidation by excess heat on the printing head heater and makes kogation The terminology "kogation" as used herein is intended to mean that ink sticks and scorches on the heater.

In order to improve the waterfastness of the ink for ink-jet printing, it has been proposed to use ink comprising (a) a pigment (see Japanese Patent Laid-Open Nos. 28776/92, 189876/92, 359071/92, and 359072/92), (b) a non-aqueous liquid medium (see Japanese Patent Laid-Open No. 261478/92), (c) a dye having excellent waterfastness (see U.S. Pat. No. 4,963,189) or (d) emulsion or dispersion of polymer particles colored with a dye (see Japanese Patent Laid-Open Nos. 250069/91 and 340835/94).

However, use of a pigment in ink (proposal (a)) tends to incur a reduction in chroma of prints and to cause clogging of the nozzles. Further, the resulting prints have insufficient scratch resistance, namely, insufficient record preservability. Polymer particles (proposal (d)) are difficult to dye to a high degree. Even if dyed to a high degree, the polymer particles have poor stability, suffering from precipitation of the dye when left to stand for a long time. Neither have the proposals (b) and (c) succeeded in providing ink fully satisfying all the requirements, such as waterfastness and scratch resistance of prints and print density.

Additionally, it has been proposed to improve the waterfastness by using ink containing a polymer emulsion, such as ink containing a latex (see Japanese Patent Laid-Open No. 18412/80) and ink containing a colored polymer latex (see Japanese Patent Laid-Open No. 30873/84).

The problem associated with the ink containing latices is that a film is formed on the printing head to cause clogging. In order to inhibit film formation, a polyhydric alcohol is usually incorporated as a wetting agent. However, ink containing a polyhydric alcohol is unsuitable for application to the inkjet printing system for its too high viscosity. Further, the latex polymer to be used particularly for application to the thermaljet system should have anti-kogation properties.

SUMMARY OF THE INVENTION

Accordingly, an object of the present invention is to provide an aqueous ink for ink-jet printing which provides prints having excellent waterfastness and exhibits improvements in print density, ink dispersion stability, ink ejection stability and anti-clogging properties of the ink, and scratch resistance of printings.

As a result of extensive study, the inventors of the present invention have found that the above object is accomplished by an aqueous ink for ink-jet printing which contains a polymer emulsion and a specific compound.

The present invention has been completed based on the above finding. The present invention provides an aqueous ink for ink-jet printing comprising a polymer emulsion and at least one compound selected from the group consisting of an amino acid or a salt thereof and substantially water-soluble compounds represented by formula (1), (2) and (3):

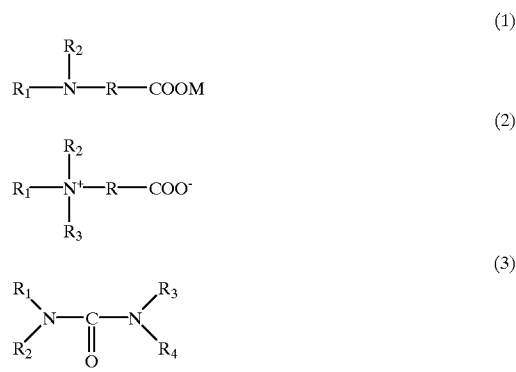

wherein $R_1$, $R_2$, $R_3$, and $R_4$, which may be the same or different, each represent a hydrogen atom, a hydrocarbon group having 1 to 5 carbon atoms or an acyl group which may be substituted by an amino group; R represents an alkylene group having 1 to 5 carbon atoms which may be substituted by a branched group; and M represents a hydrogen atom, an alkali metal atom or an alkaline earth metal atom.

The aqueous ink according to the present invention provides prints with excellent waterfastness and shows improvements in print density, ink dispersion stability, ink ejection stability and anti-clogging properties of the ink, and print scratch resistance.

Where a colorant is incorporated into a polymer emulsion by phase reversal emulsification, incorporation of the colorant can be effected easily and efficiently, and the resulting ink exhibits further improvements in anti-feathering properties and waterfastness.

While the aqueous ink according to the present invention is for use in inkjet printing, it is also applicable to other uses, for examples, as ink in general writing pens, e.g., fountain pens, ball-point pens, marker pens, etc.

DETAILED DESCRIPTION OF THE PREFERRED EMBODIMENTS

The aqueous ink for inkjet printing (hereinafter simply referred to as aqueous ink) according to the present invention contains at least one compound selected from the group consisting of the following compounds (a) to (d):

(a) An amino acid or a salt thereof (b) A substantially water-soluble compound represented by formula (1) above.

(c) A substantially water-soluble compound represented by formula (2) above.

(d) A substantially water-soluble compound represented by formula (3) above.

These compounds (a) to (d) serve to impart moisture retention to the aqueous ink to secure ink dispersion stability and ejection properties.

The amino acid (a) which can be used in the aqueous ink of the present invention includes, for example, histidine, arginine, lysine, glycine, alanine, β-alanine, isoleucine, valine, leucine, serine, threonine, cysteine, cystine, phenylalanine, proline, tyrosine, homoserine, methionine, ε-aminocaproic acid, γ-aminobutyric acid, asparagine, glutamine, glycylglycine, aspartic acid, glutamic acid, and δ-aminocapylic acid. The salt of an amino acid includes, for example, a potassium salt, a sodium salt, and a magnesium salt of the above-mentioned amino acids. Of these amino acids and their salts preferred are β-alanine, proline, γ-aminobutyric acid, arginine, and glycine. β-alanine, γ-aminobutyric acid, arginine, and proline are still preferred.

In formula (1) representing the substantially water-soluble compound (b), $R_1$ and $R_2$, which may be the same or different, each preferably represent a methyl group, an ethyl group, a propyl group, or an isopropyl group; R preferably represents a methylene group, an ethylene group, a propylene group or a butylene group, with a methylene group being still preferred, with the proviso that $R_1$ and $R_2$ do not simultaneously represent a hydrogen atom; and M preferably represents a hydrogen atom or an alkali metal atom. Of the compounds (1) those having high water solubility are particularly preferred. Examples of such compounds are N-methylglycine, N,N-dimethylglycine, N-ethylglycine, N-acetylglycine, and glycylglycine. N-Methylglycine is especially preferred for ink ejection properties, anti-clogging properties, and ink dispersion stability. The terminology "substantially water-soluble" as used herein for the compound represented by formula (1) as well as the compounds represented by formulae (2) and (3) is intended to mean that not less than 20 g of the compound dissolves in 1 liter of water.

In formula (2) representing the substantially water-soluble compound (c), $R_1$, $R_2$, and R are the same as described above as to formula (1). $R_3$ has the same meaning as $R_1$ and $R_2$. As is similar to compound (1), it is preferred for the compound (2) to have high water solubility and high moisture retention. Examples of such compounds are N,N,N-trimethylglycine, α-propiobetaine, and γ-butyrobetaine. N,N,N-Trimethylglycine is particularly preferred for ejection properties and anti-clogging properties.

In formula (3) representing the substantially water-soluble compound (d), $R_1$, $R_2$, $R_3$, and $R_4$, which may be the same or different, each preferably represent a hydrogen atom, a methyl group or an ethyl group. Of the compounds (3), as being similar to compounds (1) and (2), those having high water solubility are particularly preferred. Examples of such compounds include urea, methylurea, dimethylurea, trimethylurea, tetramethylurea, ethylurea, and diethylurea. Urea is especially preferred for ejection properties, anti-clogging properties, and prevention of viscosity increase.

Two or more compounds selected from the group consisting of (a) to (d) can be used in combination.

Each compound selected from the group consisting of (a) to (d) is preferably used in an amount of 0.5 to 50% by weight, still preferably 2 to 35% by weight, particularly preferably 5 to 25% by weight, based on the aqueous ink. If the amount is less than 0.5% by weight, the effect on moisture retention may be insufficient, resulting in reduction of ink dispersion stability. If it exceeds 50% by weight, the viscosity of the ink increases to reduce ink ejection properties, which may tend to deteriorate printing quality or to retard drying of the printed ink on a recording medium. Moreover, the resulting prints any tend to have reduced scratch resistance.

The polymer emulsion which can be used in the present invention can be an emulsion of fine polymer particles colored with a colorant. An emulsion of fine polymer particles impregnated with a water-insoluble or sparingly water-soluble colorant is preferred. The terminology "impregnated with a colorant" as used herein is intended to mean to include a state in which a colorant is encapsulated into polymer particles, a state in which a colorant is adsorbed onto the surface of polymer particles, or a mixed state thereof In any state, not all the colorant present in the aqueous ink needs to be encapsulated into the polymer particles and/or adsorbed on the polymer particles. That is, the colorant may be dispersed in the emulsion to such an extent that does not impair the advantageous effects of the present invention. In a preferred mode of the present invention, the aqueous ink comprises an aqueous dispersion (emulsion) of fine polymer particles impregnated with a water-insoluble or sparingly water-soluble colorant and contains at least one compound selected from the group consisting of (a) to (d).

The colorant to be used in the present invention is preferably selected from those capable of infiltrating into fine polymer particles. Examples of the colorants include dyes, such as oil-soluble dyes (oil colors), disperse dyes, direct dyes, acid dyes, and basic dyes; and pigments. From the viewpoint of satisfactory infiltrability, oil-soluble dye and disperse dyes are preferred. The terminology "oil-soluble dye" denotes dyes insoluble in water and soluble in mineral oil or fat and oil. The terminology "disperse dyes" denotes dyes insoluble or sparingly soluble in water and dispersible in water almost in a colloidal state. The terminology "pigment" denotes a finely particulate solid insoluble or sparingly soluble in water and an organic solvent (*Encyclopaedia CHIMICA*, edited by Kyoritsu Shuppan K.K.)

It is preferred for the dye to have an organic solvent solubility of 2 g or more, particularly 20 to 600 g, per liter of an organic solvent, e.g., a ketone solvent, for efficient incorporation into polymer particles.

The colorant is preferably used in an amount of 1 to 30% by weight, particularly 1.5 to 25% by weight, based on the aqueous ink. If the amount of the colorant is less than 1% by weight, the print density may tend to be insufficient. If it exceeds 30% by weight, an appreciable improvement in print density may not be expected, and the instability of the polymer particles may be caused with time, showing a tendency that the particle size increases and the emulsion becomes instable. In relation to the amount of the polymer, the colorant is preferably used in an amount of about 10 to 200%, particularly about 25 to 150%, by weight based on the polymer.

The polymer constituting the polymer emulsion includes, for example, vinyl polymers, polyesters, and polyurethanes, with vinyl polymers and polyesters being preferred. These preferred polymers will be described in detail.

The vinyl polymers preferably include those obtainable by copolymerizing;

(i) at least one monomer selected from the group consisting of a silicone macromer represented by formula (4):

$$X(Y)_n Si(R_5)_{3-m}(Z)_m \quad (4)$$

wherein X represents a polymerizable unsaturated group; Y represents a divalent linking group; $R_5$ represents a hydrogen atom, a lower alkyl group, an aryl group or an alkoxy group; a plurality of $R_5$'s may be the same or different; Z represents a monovalent siloxane polymer moiety having a number average molecular weight of at least about 500; n represents 0 or 1; and m represents an integer of 1 to 3, an acrylamide monomer and a methacrylamide monomer not having a salt-forming group, (ii) a polymerizable unsaturated monomer having a salt-forming group, and (iii) a monomer copolymerizable with monomers (i) and (ii)

in the presence of a radical polymerization initiator. These vinyl polymers are preferred for their satisfactory antikogation properties.

In formula (4) representing the silicone macromer, X is a polymerizable unsaturated group, such as $CH_2=CH-$ and $CH_2=C(CH_3)-$; Y is a divalent linking group, such as $-COO-$, $-COOC_bH_{2b}-$ (wherein b represents a number of 1 to 5), and a phenylene group, with $-COOC_3H_6-$ being preferred; $R_5$ is a hydrogen atom, a lower alkyl group (e.g., a methyl group or an ethyl group), an aryl group (e.g., a phenyl group), or an alkoxy group (e.g., a methoxy group), with a methyl group being preferred; Z is a monovalent siloxane polymer moiety having a number average molecular weight of at least about 500, preferably a monovalent dimethylsiloxane polymer residue having a number average molecular weight of 800 to 5000; n is 0 or 1, preferably 1; and m is an integer of 1 to 3, preferably 1.

Of the silicone macromers, preferred are those represented by formulae (4-1) to (4-4):

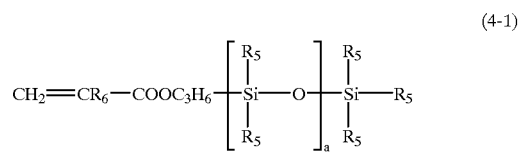

(4-1)

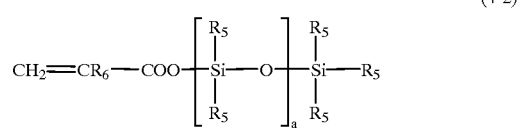

(4-2)

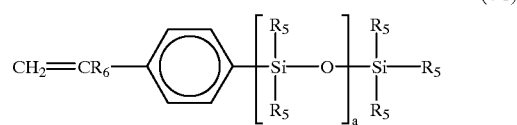

(4-3)

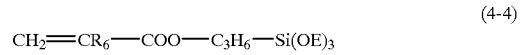

(4-4)

wherein $R_6$ represents a hydrogen atom or a methyl group; $R_5$ is as defined above; a plurality of $R_5$'s may be the same or different; E represents a group of formula:

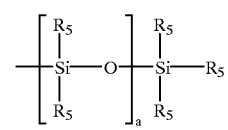

and a represents a number of from 5 to 65.

Among the silicone macromers represented by formulae (4-1) to (4-4) those of formula (4-1) are preferred. A silicone macromer represented by formula (4-1-1) shown below, which is available from Chisso Corp. under the trade name of FM-0711, is particularly preferred.

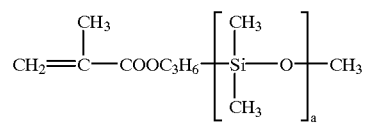

(4-1-1)

wherein a' represents a number giving a weight average molecular weight of 1,000.

The acrylamide monomer and the methacrylamide monomer not having any salt-forming group (hereinafter inclusively referred to as (meth)acrylamide monomer) which can be used in the preparation of the vinyl polymer include those described in Japanese Patent Application No. 24680/97 which is incorporated herein by reference. While not limiting, preferred examples of the (meth)acrylamide monomers include acrylamide monomers, such as acrylamide, N-(1,1-dimethyl-3-oxobutyl)acrylamide (diacetonacrylamide), N,N-dimethylacrylamide, N,N-diethylacrylamide, N,N-diisopropylacrylamide, N,N-dibutylacrylamide, N-t-butylacrylamide, N-t-hexylacrylamide, N-t-octylacrylamide, N-benzylacrylamide, N-isopropylacrylamide, N-methylolacrylamide, and N-cyclohexylacrylamide; and methacrylamide monomers, such as methacrylamide, N,N-dimethylmethacrylamide, N,N-diethylmethacrylamide, N-t-butylmethacrylamide, N-t-octylmethacrylamide, N-isopropylmethacrylamide, N-methylolmethacrylamide, and N-cyclohexylmethacrylamide.

The unsaturated monomer (ii) having a salt-forming group which can be used in the preparation of the vinyl polymer include those described in Japanese Patent Application No. 24680/97 supra. Preferred cationic monomers include unsaturated tertiary amine-containing monomers and unsaturated ammonium salt-containing monomers. Examples of these monomers include monovinylpyridine compounds, e.g., vinylpyridine, 2-methyl-5-vinylpyridine, and 2-ethyl-5-vinylpyridine; styrene derivatives having a dialkylamino group, e.g., N,N-dimethylaminostyrene and N,N-dimethylaminomethylstyrene; acrylic or methacrylic esters having a dialkylamino group, e.g., N,N-dimethylaminoethyl acrylate, N,N-dimethylaminoethyl methacrylate, N,N-dimethylaminopropyl acrylate, and N,N-diethylamninopropyl methacrylate; vinyl ethers having a dialkylamino group, e.g., 2-dimethylaminoethyl vinyl ether; acrylamide or methacrylamide derivatives having a dialkylamino group, e.g., N-(N',N'-dimethylaminoethyl) acrylamide, N-(N',N'-dimethylaminoethyl)methacrylamide, N-(N',N'-diethylaminoethyl)acrylamide, and N-(N',N'-diethylaminoethyl)methacrylamide; and quaternized monomers derived from these monomers with known quaternizing agents, such as an alkyl halide having 1 to 4 carbon atoms in the alkyl moiety. Anionic monomers include unsaturated carboxylic acid monomers, unsaturated sulfonic acid monomers, and unsaturated phosphoric acid monomers. Examples of the unsaturated carboxylic acid monomers are acrylic acid, methacrylic acid, itaconic acid, maleic acid, etc. and anhydrides and salts thereof Examples of the unsaturated sulfonic acid monomers are styrenesulfonic acid, 2-acrylamido-2-methylpropanesulfonic acid, etc. and salts thereon and a sulfuric acid monoester of 2-hydroxyethyl (meth)acrylic acid and its salt. Examples of the unsaturated phosphoric acid monomers are vinyl phosphate, diphenyl-2-methacryloyloxyethyl phosphate.

The monomers (iii) copolymerizable with the above-described monomers (i) and (ii) which can be used in the preparation of the vinyl polymer include those described in Japanese Patent Application No. 24680/97 supra. Examples of preferred monomers (iii) include acrylic esters, e.g., methyl acrylate, ethyl acrylate, n-butyl acrylate, t-butyl acrylate, 2-ethylhexyl acrylate, and dodecyl acrylate; methacrylic esters, e.g., methyl methacrylate, ethyl methacrylate, n-butyl methacrylate, t-butyl methacrylate, 2-ethylhexyl methacrylate, and dodecyl methacrylate; styrene and its derivatives, e.g., 2-methylstyrene; hydroxyl-containing acrylates and methacrylates, e.g., 2-hydroxyethyl acrylate, 3-hydroxypropyl acrylate, 2-hydroxyethyl methacrylate, and 3-hydroxypropyl methacrylate; and macromers, such as vinyl macromers having a polymerizable functional group at one terminal thereof, polyester macromers having a polymerizable fuinctional group at one terminal thereof, polyurethane macromers having a polymerizable fuinctional group at one terminal thereof, and polyalkyl ether macromers having a polymerizable functional group at one terminal thereof.

The monomers (iii) copolymerizable with the monomers (i) and (ii) are not limited to the above-enumerated examples, and commercially available radical polymerizable monomers are also useful. From the standpoint of emulsion stability against storage, one or more than one monomer represented by formula (5-1), (5-2), (5-3) or (5-4) shown below is preferably used as a monomer (iii).

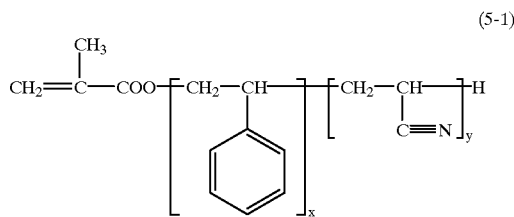

wherein x and y are numbers satisfying the relationship: x/y=6/4 to 10/0 and giving a weight average molecular weight of 1,000 to 10,000.

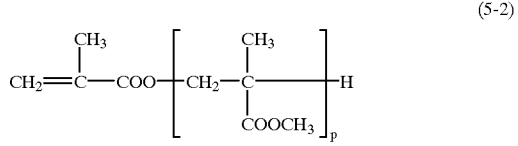

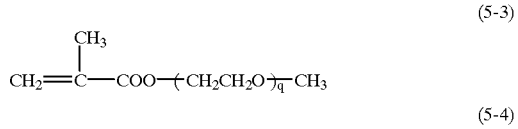

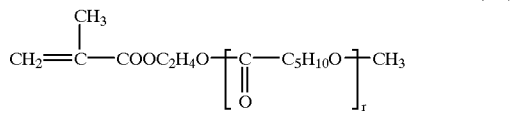

wherein p, q, and r represent numbers giving a weight average molecular weight of 500 to 10,000.

Commercially available compounds represented by formulae (5-1) through (5-4) can be also used, such as a styrene and/or acrylonitrile copolymer macromer having a methacryloyloxy group at one terminal thereof available from Toagosei Chemical Industry Co., Ltd. under the trade name of "AN-6" or "AS-6", a methyl methacrylate polymer macromer having a methacryloyloxy group at one terminal thereof available from Toagosei Chemical Industry Co., Ltd. under the trade name of "AA-6", a polyoxyethylene macromer having a methacryloyloxy group at one terminal thereof available from Shin-Nakamura Kagaku K.K. under the trade name of "NK Ester M-90Gnew", "NK Ester M-40Gnew" and "NK Ester M-20Gnew", and a polyester macromer having a methacryloyloxy group at one terminal thereof available from Daicel Chemical Industries, Ltd. under the trade name of "FM4DX".

The vinyl polymer is preferably prepared by using (i) 1 to 40% by weight of at least one monomer selected from the group consisting of silicone macromers represented by formula (4) and (meth)acrylamide monomers, (ii) 1 to 25% by weight of the monomer having a salt-forming group, and (iii) 35 to 98% by weight of other copolymerizable monomers, each based on the total monomer mixture.

The vinyl polymer can prepared by known polymerization processes, such as bulk polymerization, solution polymerization, suspension polymerization, and emulsion polymerization, preferably by solution polymerization. Known organic solvents can be used in solution polymerization, including aliphatic alcohols, such as ethanol and propanol; ketones, such as acetone and methyl ethyl ketone; esters, such as ethyl acetate; and aromatic hydrocarbons, such as benzene and toluene. These organic solvents can be used either individually or as a mixture of two or more thereof.

The radical polymerization initiator which can be used in the polymerization preferably includes azo compounds, such as 2,2'-azobisisobutyronitrile, 2,2'-azobis(2,4-dimethylvaleronitrile), 2,2'-azobis(4-methoxy-2,4-dimethylvaleronitrile), dimethyl 2,2'-azobisbutyrate, 2,2'-azobis(2-methylbutyronitrile), and 1,1'-azobis(1-cyclohexanecarbonitrile). Organic peroxides, such as t-butyl peroctylate, dicumyl peroxide, di-t-butyl peroxide, and dibenzoyl oxide, are also useful. The polymerization initiator is preferably used in an amount of 0.001 to 2.0 mol %, particularly 0.01 to 1.0 mol %, based on the total monomer mixture.

A chain transfer agent can be added to the polymerization system. The chain transfer agents described in Japanese Patent Application No. 24680/97 can be used. Examples of preferable chain transfer agents include mercaptans, such as mercaptoethanol, n-dodecyl mercaptan, and t-dodecyl mercaptan; xanthogen disulfide derivatives, such as dimethylxanthogen disulfide; thiuram disulfide derivatives, such as tetramethylthiuram disulfide; halogenated hydrocarbons, such as carbon tetrachloride; hydrocarbons, such as pentaphenylethane; unsaturated cyclic hydrocarbon compounds, such as acrolein, methacrolein, allyl alcohol, α-methylstyrene dimer (preferably comprising 50% by weight or more of 2,4-diphenyl-4-methyl-1-pentene); and unsaturated heterocyclic compounds, such as xanthene and 2,5-dihydrofuran. These compounds may be used either individually or as a combination of two or more thereof.

While the reaction temperature and time are selected appropriately according to the kinds of the radical polymerization initiator, monomers, and solvent, the polymerization is usually carried out at 30 to 100° C., preferably 50 to 80° C., for 1 to 10 hours. The polymerization is preferably performed in an inert gas atmosphere, such as nitrogen. After the polymerization, the vinyl polymer produced is isolated from the reaction system by known means, such as reprecipitation and solvent removal. The resulting vinyl polymer is purified by removing any residual monomers through repetition of reprecipitation, membrane separation, chromatography, extraction, and the like means.

The resulting vinyl polymer preferably has a weight average molecular weight of 3,000 to 80,000, preferably 3,000 to 50,000.

Next, the polyester which can be used in the polymer emulsion will be described. It is preferred that the polyester has an acid value of 3 to 100 mg-KOH/g as measured in accordance with JIS K 0070. Polyesters having an acid value of less than 3 mg-KOH/g may tend to fail to provide an emulsion in which fine polymer particles are stably impregnated with a colorant. If the acid value is more than 100 mg-KOH/g, the resulting ink may tend to have poor waterfastness. For obtaining better results in emulsion forming properties and emulsion stability, the acid value of the polyester is still preferably 3 to 90 mg-KOH/g, particularly preferably 30 to 80 mg-KOH/g, especially preferably 50 to 70 mg-KOH/g.

From the standpoint of improvements in anti-kogation properties on a printing head heater, waterfastness and scratch resistance of the ink after printing, and emulsion-forming properties, the number average molecular weight (as measured by gel-permeation chromatography calibrated by polystyrene) of the polyester is preferably 500 to 100,000, still preferably 1,000 to 50,000, particularly preferably 1,500 to 30,000, especially preferably 2,000 to 15,000.

Polyesters having the above-described preferred physical properties include those containing, in the polyester chain thereof, a unit derived from a diol component represented by formula (6):

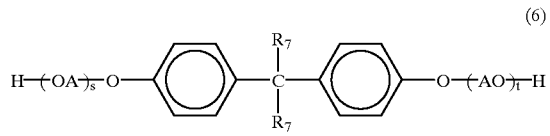

(6)

wherein $R_7$ represents an alkyl group having 1 to 4 carbon atoms; A represents an alkylene group having 2 to 4 carbon atoms; s and t, which may be the same or different, each represent an integer of 1 or more; and the sum of s and t averages 2 to 10.

In particular, polyesters obtainable by polycondensation of the diol component represented by formula (6) (hereinafter referred to as component (a)) and a polycarboxylic acid derivative (hereinafter referred to as component (b)) are preferred. These polyesters will hereinafter be referred to as polyester (A). The term "polycarboxylic acid derivative" as sued herein means a polycarboxylic acid, an anhydride thereof or a lower alkyl ester thereof.

The diol component represented by formula (6) (component (a)) is not particularly limited and includes an alkylene oxide adduct of bisphenol A, preferably an ethylene oxide or propylene oxide adduct of bisphenol A.

The polycarboxylic acid derivative as component (b) is not particularly limited. As stated above, at least one compound selected from the group consisting of a polycarboxylic acid and an anhydride and lower alkyl ester thereof is used.

The polycarboxylic acid to be used includes dicarboxylic acids, tricarboxylic acids, and polycarboxylic acids having four or more carboxyl groups per molecule. The lower alkyl esters of these polycarboxylic acids are preferably those having 1 to 4 carbon atoms in the alkyl moiety thereof. Among them, dicarboxylic acids, such as maleic acid, fumaric acid, itaconic acid, phthalic acid, isophthalic acid, terephthalic acid, succinic acid, and a dimeric acid; 1,2,4-benzenetricarboxylic acid, and trimellitic anhydride are preferred. In polyester (A), component (a) and component (b) are combined arbitrarily at such a component (a) to component (b) molar ratio as to give an acid value of 3 to 100 mg-KOH/g as measured in accordance with JIS K 0070 and a glass transition temperature (hereinafter abbreviated as Tg) of not lower than 20° C., while the molar ratio varies according to the desired acid value, number average molecular weight, and Tg of polyester (A).

Polyesters obtainable by polycondensation of the diol component represented by formula (6) (i.e., component (a)), a dimeric acid (hereinafter referred to as component (b')), and a polycarboxylic acid derivative other than a dimeric acid (hereinafter referred to as component (b")) are also preferred. These polyesters will hereinafter be referred to as polyester (B).

Component (a) used in the preparation of polyester (B) is the same as used in the preparation of polyester (A).

The terminology "dimeric acid" as used herein is a substance synthesized by polymerizing two molecules of an unsaturated fatty acid. The dimeric acids suited as component (b') include acyclic dimeric acids, monocyclic dimeric acids, and bicyclic dimeric acids. Use of these dimeric acids as a polycondensing component in the polyester brings about improvements in emulsion-forming properties and emulsion stability and an increase in amount of colorant incorporated. These dimeric acids can be used either individually or as a combination of two or more thereof.

Commercially available dimeric acids can be also used. General dimeric acids on the market are mixtures of an acyclic dimeric acid, a monocyclic dimeric acid, and a bicyclic dimeric acid. Examples of such commercially available dimeric acids include "UNDIME 22" (acyclic dimer-rich type, a trade name of Union Cap) and "HARDINvER 250K" (monocyclic and bicyclic dimer-rich type, a trade name of Harima Kasei K.K.).

Of the above-described dimeric acids, those comprising an acyclic dimeric acid as a major component are preferred for further enhancing the emulsion-forming properties and emulsion stability.

Component (b") which can be used in the preparation of polyester (B) can be selected from the polycarboxylic acids enumerated above as component (b) for use in polyester (A) except dimeric acids.

In polyester (B), components (a), (b'), and (b") are combined arbitrarily at such a molar ratio as to give an acid value of 3 to 100 mg-KOH/g as measured in accordance with JIS K 0070 and a Tg of not lower than 20° C., while the molar ratio varies according to the desired acid value, number average molecular weight, and Tg of polyester (B). It is preferred that component (b') be used in an amount of 0.001 to 0.7 mol, particularly 0.01 to 0.5 mol, per mole of component (a) and that component (b") be used in an amount of 0.3 to 1.2 mol, particularly 0.5 to 1.1 mol, per mole of component (a).

Polyesters obtainable by polycondensation of the diol component represented by formula (6) (i.e., component (a)), the dimeric acid (i.e., component (b')), trimellitic anhydride (hereinafter referred to as component (b*)), and a polycarboxylic acid derivative other than components (b') and (b*) (hereinafter referred to as component (b**)) are also preferred. These polyesters will hereinafter be referred to as polyester (C).

Component (a) used in the preparation of polyester (C) is the same as used in the preparation of polyester (A). Component (b') is the same as used in the preparation of polyester (B). Use of component (b*), trimellitic anhydride, as a polycondensing component in the polyester brings about improvements in emulsion-forming properties and emulsion stability and an increase in amount of colorant incorporated.

Component (b**) to be used in the preparation of polyester (C) can be selected from the polycarboxylic acid derivatives enumerated above as to component (b) used in the preparation of polyester (A) except dimeric acids and trimellitic anhydride.

In polyester (C), components (a), (b'), (b*), and (b**) are combined arbitrarily at such a molar ratio as to give an acid value of 3 to 100 mg-KOH/g as measured in accordance with JIS K 0070 and a Tg of not lower than 20° C., while the molar ratio varies according to the desired acid value, number average molecular weight, and Tg of polyester (C). It is preferred that component (b') be used in an amount of 0.001 to 0.7 mol. particularly 0.01 to 0.5 mol, per mole of component (a); component (b*) be used in an amount of 0.05 to 0.7 mol, particularly 0.1 to 0.5 mol, per mole of component (a), and component (b**) be used in an amount of 0.3 to 1.2 mol, particularly 0.5 to 1.1 mol. per mole of component (a).

The acid value, Tg, and number average molecular weight of polyesters (A), (B) and (C) can be adjusted by, for example, varying the ratio of the respective polycondensing components (components (a), (b), (b'), (b"), (b*), and (b**)), using a carboxylic acid ester, or blocking the acid with a monohydric alcohol. Any known methods can be used for carrying out the polycondensation reaction with no particular restriction.

It is preferred that the above-described polymers be present in the aqueous ink of the present invention in an amount of 1 to 30%, particularly 2 to 20%, by weight on a solid basis. If the amount of the polymer is less than 1% by weight, the ink may tend to have an insufficient print density. If it exceeds 30% by weight, the storage stability of the emulsion as ink may tend to be reduced and, particularly when the ink is used in an ink-jet printer, the ink may tend to incur the clogging of the printing head due to an increase in viscosity accompanying evaporation from the tip of the nozzles or agglomeration of the polymer particles.

The fine polymer particles preferably have a particle size of 0.1 to 500 nm, particularly 5 to 300 nm. If the polymer particle size is smaller than 0.1 nm, the ink may tend to cause feathering. If it exceeds 500 nm, the emulsion itself may tend to be instable. The polymer particle size can be controlled by, for example, altering the conditions of phase reversal emulsification hereinafter described.

It is preferable for the polymer to have a Tg, as measured with a differential scanning calorimeter (DSC), of not lower than 20° C. for use in an ink-jet system using a piezoelectric element or not lower than 30° C. for use in an ink-jet system using thermal energy. Whichever system may be used, the Tg is still preferably 40 to 250° C., particularly preferably 50 to 200° C. With the Tg falling within the above preferred range, the polymer can be prevented from solidifying in the nozzles of a printer, causing no clogging; or when a printed sheet of paper is piled on top of another, transfer of ink to the reverse side of the upper sheet is prevented.

The aqueous ink of the present invention comprises water, preferably ion-exchanged water, as a medium. The proportion of water in the aqueous ink preferably ranges from 50 to 98%, still preferably 55 to 95%, particularly preferably 60 to 90%, by weight.

The aqueous ink can contain conventional wetting agents, such as polyhydric alcohols, in addition to the above-described components, in such an amount that the viscosity of the aqueous ink may not exceed a level preferred for use in ink-jet printing. Such an amount of wetting agents preferably ranges from 0.1 to 50%, particularly 1 to 30%, by weight based on the aqueous ink.

If desired, the aqueous ink may additionally contain various conventional additives, such as dispersants, defoaming agents (e.g., silicone), surface tension regulators including, various cationic, anionic or nonionic surface active agents, ultraviolet absorbers (e.g., benzotriazole, benzophenone, salicylic esters, and cyanoacrylates), antifungal agents (e.g., chloromethylphenol derivatives), chelating agents (e.g., ethylenediaminetetraacetic acid), and oxygen absorbers (e.g., sulfites).

While not limiting, the amount of the dispersant to be added is preferably 0.01 to 10%, still preferably 0.05 to 5%, particularly preferably 0.1 to 1%, by weight based on the aqueous ink in view of reduction in polymer particle size and improvement in emulsion stability.

The amount of the defoaming agent to be added is not particularly limited, but it is preferably added in an amount of 0.001 to 2%, particularly 0.005 to 0.5%, by weight based on the aqueous ink. If the amount of the defoaming agent is more than 2% by weight, foaming is suppressed, but runaway tends to occur in the ink on printing to reduce printing quality.

The surface tension regulators include the above-described silicone defoaming agents and cationic, anionic or nonionic surface active agents. It is preferred to use the silicone defoaming agents, ethylene oxide compounds of alkylphenols or ethylene oxide adducts of acetylene glycol from the viewpoint of suppression of foaming, ease of control of the surface tension, ink ejection properties, anti-feathering properties, and uniform print density.

The surface tension regulators can be used either individually or as a combination of two or more thereof. They are desirably used in an amount of 0.005 to 15% by weight based on the aqueous ink from the standpoint of printing quality and ink dispersion stability.

It is preferable that the surface tension of the aqueous ink at 20° C. be within a range of from 25 to 65 dyne/cm (mN/m), particularly 25 to 55 dyne/crn, especially 28 to 50 dyne/cm. If the surface tension is less than 25 dyne/cm, the ink may tend to cause feathering and have reduced printing quality, or leak from the printing head nozzles of an ink-jet printer. The surface tension of ink can be measured with an automatic surface tensiometer (Model CBVP-Z, manufactured by Kyowa Kaimen Kagaku K.K.).

The aqueous ink preferably has a viscosity of 0.5 to 8 cps (mPa·sec), particularly 0.5 to 5 cps, more particularly 1 to 5 cps, still more particularly 1 to 3 cps, at 20° C. from the viewpoint of ejection stability in an inkjet printer. If the viscosity is less than 0.5 cp, the ink may cause feathering remarkably or tend to leak from the printing head nozzles of an inkjet printer. If it exceeds 8 cps, the ink has too high viscosity for use in an ink-jet printer, failing to be sufficiently supplied to the printing head, causing inadequacy of ink ejection, which results in ununiform printing or reduction in printing quality. The viscosity of ink can be measured with an E-type viscometer (VISCONIC ELD, manufactured by Tokyo Keiki K.K.) or a rotational vibration viscometer (Viscomate VM-100, manufactured by Nikkato Corp., Tokyo Branch).

A preferred process for preparing the aqueous ink according to the present invention will be illustrated below.

The polymer and the colorant are added to a water-insoluble organic solvent to form a solution or a dispersion. A neutralizing agent and, if desired, a surface active agent are added thereto to ionize the salt-forming group of the polymer. Water is added to the mixture, and the mixture is emulsified in a conventional manner, for example, by use of an emulsifier, e.g., Microfluidizer, or by phase reversal emulsification. Thereafter the system is heated under reduced pressure to evaporate the organic solvent to give an emulsion of fine polymer particles impregnated with the colorant.

A hydrophobic stabilizer of various kinds can be dissolved in the water-insoluble organic solvent together with the colorant and thereby stably encapsulated the colorant into the polymer particles. While not limiting, suitable stabilizers include the above-described ultraviolet absorbers (e.g., benzotriazole, benzophenone, salicylic esters, and cyanoacrylates); primary antioxidants, such as hindered phenol or amine type antioxidants; secondary antioxidants, such as phosphorus or sulfur type antioxidants; and ultraviolet stabilizers, such as hindered amine type compounds.

The resulting colorant-impregnated polymer emulsion and a compound or compounds selected from the group consisting of (a) to (d) and, if desired, other components are dispersively mixed to obtain aqueous ink of the present invention.

After the formulation, it is preferable to remove coarse particles by, for example, filtration under pressure or centrifugation. Coarse particles greater than 2000 nm, particularly greater than 1000 nm, especially greater than 500 nm, are preferably removed to thereby obtain ink causing no clogging.

The pH of the polymer emulsion and the finally obtained aqueous ink is preferably adjusted within a range of from 5 to 12, particularly 5.5 to 10, in order to secure emulsion stability.

While the aqueous ink according to the present invention is for use in ink-jet printing as described hereinabove, it is also applicable to other uses, for examples, as ink in general writing pens, e.g., fountain pens, ball-point pens, marker pens, etc.

The present invention will now be illustrated in greater detail by way of Preparation Examples of the polymer emulsions used in the present invention and Examples of the aqueous ink according to the present invention in view of Comparative Examples, but it should be understood that the present invention is not construed as being limited thereto. Unless otherwise noted, all the percents and parts are by weight.

PREPARATION EXAMPLE 1

In a reactor equipped with a stirrer, a reflux condenser, a dropping funnel, a thermometer, and a tube for introducing nitrogen were charged 20 g of methyl ethyl ketone as a polymerization solvent and the unsaturated monomers and chain transfer agent shown in Table 1 below, the row "Initially charged", and the atmosphere was thoroughly displaced with nitrogen. In the dropping funnel, after thorough displacement with nitrogen, the monomers and chain transfer agent shown in Table 1, the row "Added dropwise", 60 g of methyl ethyl ketone, and 0.2 g of 2,2'-azobis(2,4-dimethylvaleronitrile) were charged. The mixture in the reactor was heated up to 65° C. while stirring in a nitrogen atmosphere, and then the mixture in the dropping funnel was added thereto dropwise over a period of 3 hours. After completion of the dropwise addition, the stirring was continued for an additional 2 hour period. A solution of 0.1 g of 2,2'-azobis(2,4-dimethylvaleronitrile) dissolved in 5 g of methyl ethyl ketone was added to the reaction system, followed by aging at 65° C. for 2 hours and at 70° C. for 2 hours to obtain a vinyl polymer solution.

Part of the resulting polymer solution was evaporated under reduced pressure at 105° C. for 2 hours to completely remove the solvent. The thus isolated polymer was found to have a weight average molecular weight of about 10,000 as measured by gel-permeation chromatography using polystyrene as a standard and tetrahydrofairan as a solvent and a Tg of 180° C. as measured with DSC.

Five grams of the vinyl polymer, isolated from the vinyl polymer solution by drying under reduced pressure, and 5 g of Vail Fast Blue 2606 (produced by Orient Kagaku K.K.) were dissolved completely in 25 g of toluene, and 2 g of a sodium hydroxide aqueous solution was added to the solution to partially neutralize the salt-forming groups of the polymer. Then, 300 g of ion-exchanged water was added thereto, followed by stirring, and the mixture was emulsified in Microfluidizer (manufactured by Nlicrofluidizer) at 8500 psi for 30 minutes. Toluene was completely evaporated from the resulting emulsion at 60° C. under reduced pressure, and part of water was also removed to give an emulsion of fine vinyl polymer particles impregnated with a hydrophobic dye (average particle size: 98 nm; solid contents: 10%).

TABLE 1

|  | Monomers and Chain Transfer Agent | Amount (part) |
|---|---|---|
| Initially charged | Methyl methacrylate | 13 |
|  | Hydroxyethyl methacrylate | 1 |
|  | Methacrylic acid | 3 |
|  | Silicone macromer FM-0711 | 2 |
|  | Styrene-acrylonitrile macromer AN-6 | 1 |
|  | Mercaptoethanol | 0.3 |
| Added dropwise | Methyl methacrylate | 52 |
|  | Hydroxyethyl methacrylate | 4 |
|  | Methacrylic acid | 12 |
|  | Silicone macromer FM-0711 | 8 |
|  | Styrene-acrylonitrile macromer AN-6 | 4 |
|  | Mercaptoethanol | 1.2 |

EXAMPLE 1

The components listed below were formulated, and the resulting dispersion was filtered through a 0.2 μm filter to remove dust and coarse particles to obtain aqueous ink.

Printing was carried out using the resulting ink on a commercially available ink-jet printer, Color Bubble Jet Printer "Model BJC-420J" manufactured by Canon Inc. The waterfastness, and scratch resistance of the printed ink were evaluated in accordance with the following methods. As a result, the ink of Example 1 was proved excellent in waterfastness and scratch resistance. Further, the amount of the colorant incorporated into the polymer particles, print density, ink dispersion stability, ink ejection properties (ink output), anti-clogging properties, and drying resistance were evaluated in accordance with the following methods. The results obtained are shown in Table 2 below.

| Emulsion of Preparation Example 1 | 60 g |
|---|---|
| N-Methylglycine | 10 g |
| Diethylene glycol | 5 g |
| Acetylenol EH | 1 g |
| Ion-exchanged water | 24 g |

1) Waterfastness

Regenerated paper for plain paper copier (PPC) (manufactured by Nippon Kakoh Seishi K.K.) was printed solid with the ink and allowed to stand for at least 1 hour. The printed sheet was put vertically into still water, maintained for 10 seconds, and then lifted up vertically. After spontaneously drying in a room, the optical density of the non-printed white background was measured with a Macbeth densitometer RD918 (manufactured by Macbeth) to evaluate waterfastness of the ink.

2) Scratch Resistance

Glossy paper for inkjet printing (Photo Quality Paper MJA4SP3, produced by Epson) was printed solid with the ink. The printed surface was reciprocally rubbed 5 times with an eraser (width: 18.5 mm) set at a fixed incline of 45° with a load of 1 kg thereon, and the condition of the rubbed printed surface was observed with the naked eye to evaluate scratch resistance.

3) Amount of Colorant Incorporated

Ten grams of the polymer emulsion were dissolved in 40 g of toluene, and the absorbance of the solution was measured to obtain the amount of the colorant having been incorporated into the polymer particles. The amount of the colorant incorporated can be obtained by calculation from the ratio of the colorant to the polymer used in the preparation of the polymer emulsion.

4) Print Density

Regenerated paper for PPC (manufactured by Nippon Kakoh Seishi K.K.) was printed solid with the ink and dried spontaneously for 24 hours in a room. The optical density of the print was measured with a Macbeth densitometer (RD 918, manufactured by Macbeth).

5) Ink Dispersion Stability

The ink under evaluation was allowed to stand in a thermostat set at 50° C. for 1 month. The particle size distribution of the ink was measured with a Coulter counter before and after the standing, and the ink dispersion stability was evaluated according to the following rating system.

A) No change was observed at all in particle size distribution; mono-disperse system; average particle size: 100 nm or less B) A slight change was observed in particle size distribution; mono-disperse system; average particle size: 100 nm or less C) A change in particle size distribution was observed; poly-disperse system having two or more peaks; average particle size: 200 nm or less D) Particles agglomerated to form sediment.

6) Ink Output

Regenerated paper for PPC (manufactured by Nippon Kakoh Seishi K.K.) was printed solid with the ink. The ink cartridge was weighed before and after the printing, and the ink output was calculated from the difference in weight.

7) Anti-clogging Properties

Alphanumerical letters were continuously printed for 10 minutes by a commercially available ink-jet printer (Color Bubble Jet Printer MIodel BJC420J, manufactured by Canon Inc.). The printer was stopped and allowed to stand uncapped at 40° C. and 25% RH for 2 weeks. After the standing, printing of alphanumerical letters was resumed. The number of movements for restoration from clogging (cleaning) that were required for obtaining prints of the same quality as that obtained before standing was examined.

A) No restoration movement was required for obtaining printing quality equal to the initial printing quality.

B) The initial printing quality was restored after 1 or 2 restoration movements.

C) The initial printing quality was restored after 3 to 5 restoration movements.

D) The initial printing quality was not restored even after 6 or more restoration movements.

8) Drying Resistance

A few drops of the ink were dropped in an aluminum cup and allowed to dry at room temperature. The time required for forming a dried film was measured. The drying resistance thus measured is one of indications of anti-clogging properties.

EXAMPLE 2

Aqueous ink was prepared in the same manner as in Example 1, except for replacing N-methylglycine with 10 g of β-alanine. The resulting ink was evaluated in the same manner as in Example 1. As a result, the ink of Example 2 was proved excellent in waterfastness and scratch resistance. Other results obtained are shown in Table 2.

EXAMPLE 3

Aqueous ink was prepared in the same manner as in Example 1, except for replacing N-methylglycine with 10 g of N,N,N-trimethylglycine. The resulting ink was evaluated in the same manner as in Example 1. As a result, the ink of Example 3 was proved excellent in waterfastness and scratch resistance. Other results obtained are shown in Table 2.

EXAMPLE 4

Aqueous ink was prepared in the same manner as in Example 1, except for replacing N-methylglycine with 10 g of urea The resulting ink was evaluated in the same manner as in Example 1. As a result, the ink of Example 4 was proved excellent in waterfastness and scratch resistance. Other results obtained are shown in Table 2.

COMPARATIVE EXAMPLES 1 AND 2

Aqueous ink was prepared in the same manner as in Example 1, except for replacing N-methylglycine with diethylene glycol (Comparative Example 1) or glycerine (Comparative Example 2). The resulting ink was evaluated in the same manner as in Example 1. The results obtained are shown in Table 2.

PREPARATION EXAMPLE 2

In a 2-litter-four-necked glass flask were charged 1050 g of polyoxypropylene (2,2)-2,2-bis(4-hydroxyphenyl) propane, 90 g of a dimeric acid mixture comprising 30% of acyclic dimeric acid compounds and 10% of monocyclic dimeric acid compounds, 270 g of fumaric acid, 120 of trimellitic anhydride, and 1.5 g of hydroquinone. A thermometer, a stainless steel-made stirring rod, a downflow condenser, and a tube for introducing nitrogen were fitted to the flask. The mixture was allowed to react while stirring at 210° C. in a nitrogen stream in a mantle heater. The degree of polymerization was followed taking the softening point measured according to ASTM E28-67 as a measure, and the reaction was ceased when the softening point reached 100° C. The resulting polyester was a pale yellow solid whose Tg was 58° C. as measured with DSC. The polyester had an acid value of 53 mg-KOH/g as measured in accordance with JIS K 0070 and a number average molecular weight (on styrene calibration in gel-permeation chromatography) of 5,500.

Into a separable flask were put 150 g of the polyester, 70 g of an oil-soluble dye (OIL BLACK 860, produced by Orient Kagaku K.K.), and 500 g of tetrahydrofuran. After purging the flask with $N_2$, the mixture was stirred to completely dissolve the polyester and the oil-soluble dye in tetrahydrofuran. Subsequently, 13.90 g of dimethylethanolamine and 1.13 g of sodium hydroxide were added thereto to ionize the carboxyl groups in the polyester. To the mixture was further added dropwise an aqueous solution of 3 g of a naphthalenesulfonic acid-formalin condensate salt (HLB value: 8.51) and 50 g of N-methylglycine in 960 g of ion-exchanged water, followed by stirring. The mixture was heated to 40° C. under reduced pressure to remove tetrahydrofuran to obtain an emulsion of fine polyester particles impregnated with the colorant (oil-soluble dye) and containing 5% N-methylglycine (average particle size: 20 nm; solids content: 20%).

EXAMPLE 5

The components listed below were formulated, and the resulting dispersion was filtered through a 0.2 μm filter to remove dust and coarse particles to obtain aqueous ink.

The resulting ink was evaluated in the same manner as in Example 1. As a result, the ink of Example 5 was proved excellent in waterfastness and scratch resistance. Other results obtained are shown in Table 2.

| | |
|---|---|
| Emulsion of Preparation Example 2 | 60 g |
| Diethylene glycol | 10 g |
| Glycerol | 2 g |
| Acetylenol EH | 1 g |
| Ion-exchanged water | 27 g |

EXAMPLE 6

Aqueous ink was prepared in the same manner as in Example 5, except for using the following components.

| | |
|---|---|
| Emulsion of Preparation Example 2 | 60 g |
| N-Methylglycine | 10 g |
| Glycerol | 2 g |
| Acetylenol EH | 1 g |
| Ion-exchanged water | 27 g |

The resulting ink was evaluated in the same manner as in Example 1. As a result, the ink of Example 6 was proved excellent in waterfastness and scratch resistance. Other results obtained are shown in Table 2.

EXAMPLE 7

A polyester emulsion was prepared in the same manner as in Preparation Example 2, except for replacing N-methylglycine with 10 g of γ-alanine. Aqueous ink was prepared in the same manner as in Example 5, except for using the resulting polyester emulsion.

The resulting ink was evaluated in the same manner as in Example 1. As a result, the ink of Example 7 was proved excellent in waterfastness and scratch resistance. Other results obtained are shown in Table 2.

EXAMPLE 8

A polyester emulsion was prepared in the same manner as in Preparation Example 2, except for replacing N-methylglycine with 10 g of N,N,N-trimethylglycine. Aqueous ink was prepared in the same manner as in Example 5, except for using the resulting polyester emulsion.

The resulting ink was evaluated in the same manner as in Example 1. As a result, the ink of Example 8 was proved excellent in waterfastness and scratch resistance. Other results obtained are shown in Table 2.

EXAMPLE 9

A polyester emulsion was prepared in the same manner as in Preparation Example 2, except for replacing N-methylglycine with 10 g of urea. Aqueous ink was prepared in the same manner as in Example 5, except for using the resulting polyester emulsion.

The resulting ink was evaluated in the same manner as in Example 1. As a result, the ink of Example 9 was proved excellent in waterfastness and scratch resistance. Other results obtained are shown in Table 2.

COMPARATIVE EXAMPLE 3

The procedure of Preparation Example 2 was followed, except for using the polyester synthesized as described below and using no N-methylglycine. However, the colorant charged (oil-soluble dye) was precipitated for the most part together with part of the polyester. The precipitate was removed by filtration to obtain an emulsion of fine polyester particles impregnated with the colorant (average particle size: 40 nm; solids content: 10%).

Synthesis of Polyester

Into an autoclave equipped with a thermometer and a stirrer were put 130 parts of dimethyl terephthalate, 56 parts of dimethyl isophthalate, 6 parts of a dimethyl ester of sodium 5-sulfoisophthalate, 159 parts of ethylene glycol, 30 parts of tricyclodecanedimethanol, and 0.1 part of titanium tetrabutoxide, and the mixture was heated at 180 to 230° C. for 120 minutes to carry out ester exchange. The reaction temperature was elevated to 240° C., and the pressure applied to the reaction mixture was adjusted to 1 to 10 mmHg. The reaction was stopped when the softening point of the product reached 100° C. The resulting polyester was a slightly yellowish white solid having a Tg of 50° C.

Aqueous ink was prepared in the same manner as in Example 5, except for using the following components.

| | |
|---|---|
| The above-prepared emulsion | 60 g |
| Diethylene glycol | 10 g |
| Glycerol | 2 g |
| Acetylenol EH | 1 g |
| Ion-exchanged water | 27 g |

The resulting ink was evaluated in the same manner as in Example 1. The results obtained are shown in Table 2.

TABLE 2

| | Amount of Colorant Incorporated (%) | Print Density | Ink Dispersion Stability | Ink Output (%) | Anti-clogging Properties | Drying Resistance |
|---|---|---|---|---|---|---|
| Example 1 | 100 | 1.47 | A | 95 | A | >3 days |
| Example 2 | 100 | 1.40 | A | 90 | A | >3 days |
| Example 3 | 100 | 1.60 | A | 105 | A | >3 days |
| Example 4 | 100 | 1.58 | A | 100 | A | >3 days |
| Example 5 | 47 | 1.42 | A | 95 | A | >3 days |
| Example 6 | 47 | 1.50 | A | 100 | A | >3 days |

TABLE 2-continued

|  | Amount of Colorant Incorporated (%) | Print Density | Ink Dispersion Stability | Ink Output (%) | Anti-clogging Properties | Drying Resistance |
|---|---|---|---|---|---|---|
| Example 7 | 47 | 1.40 | A | 93 | A | >3 days |
| Example 8 | 47 | 1.50 | A | 100 | A. | >3 days |
| Example 9 | 47 | 1.50 | A | 100 | A | >3 days |
| Compara. Example 1 | 50 | 0.42 | B | 50 | C | <60 mins |
| Compara. Example 2 | 50 | 0.42 | B | 50 | C | <60 mins |
| Compara. Example 3 | 8 | 0.50 | C | 60 | C | <60 mins |

Note:
In Examples 1 to 9 and Comparative Examples 1 to 3, the inks had a surface tension of 32 to 48 mN/m (20° C.) and a viscosity of 1.2 to 5.0 mPa · sec (20° C.).

As is apparent from the results shown in Table 2, the aqueous inks of Examples 1 to 9 which comprised an emulsion of vinyl or polyester fine particles impregnated with a colorant and contained a specific compound exhibited satisfactory waterfastness and scratch resistance and showed improvements over the comparative ink having conventional formulations (Comparative Examples 1 to 3) in print density, printing quality, ink dispersion stability, ink ejection stability, anti-clogging properties, and drying resistance. In addition, while not shown in Table 2, the aqueous inks of Examples 1 through 9 were free from feathering on paper and did not suffer considerable kogation and sticking onto the printing head even when applied to a thermal-jet printing system using thermal energy.

It is seen that the aqueous inks of Examples 1 to 9 are particularly excellent in ink dispersion stability, ink ejection stability, and anti-clogging properties.

This application claims priority of Japanese Patent Application Nos. 9-24679 filed Feb. 7, 1997 and 9-94240 filed Apr. 11, 1997 which are incorporated herein by reference.

What is claimed is:

1. An aqueous ink for inkjet printing comprising a polymer emulsion and at least one compound selected from the group consisting of an amino acid or a salt thereof and substantially water-soluble compounds represented by formula (1) and (2):

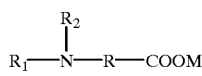

(1)

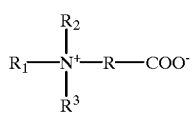

(2)

wherein $R_1$, $R_2$, and $R_3$, which may be the same or different, each represent a hydrogen atom, a hydrocarbon group having 1 to 5 carbon atoms or an acyl group which may be substituted by an amino group; R represents an alkylene group having 1 to 5 carbon atoms which may be substituted by a branched group; and M represents a hydrogen atom, an alkali metal atom or an alkaline earth metal atom.

2. The aqueous ink for ink-jet printing according to claim 1, wherein said polymer emulsion is an emulsion of fine polymer particles impregnated with a water-insoluble or sparingly water-soluble colorant.

3. The aqueous ink for ink-jet printing according to claim 1, wherein the polymer of said polymer emulsion comprises a vinyl polymer or a polyester.

4. The aqueous ink for ink-jet printing according to claim 1, wherein said vinyl polymer is obtainable by copolymerizing:

(i) at least one monomer selected from the group consisting of a silicone macromer represented by formula (4):

$$X(Y)_n Si(R_5)_{3-m}(Z)_m \quad (4)$$

wherein X represents a polymerizable unsaturated group; Y represents a divalent linking group; $R_5$ represents a hydrogen atom, a lower aflkyl group, an aryl group or an alkoxy group; a plurality of $R_5$'s may be the same or different; Z represents a monovalent siloxane polymer moiety having a number average molecular weight of at least about 500; n represents 0 or 1; and m represents an integer of 1 to 3, an acrylamide monomer and a methacrylamide monomer not having a salt-forming group, (ii) a polymerizable unsaturated monomer having a salt-forming group, and (iii) a monomer copolymerizable with monomers (i) and (ii) in the presence of a radical polymerization initiator.

5. The aqueous ink for ink-jet printing according to claim 1, wherein said polyester contains in the polyester chain thereof a unit derived from a diol component represented by formula (6):

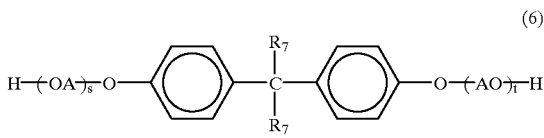

(6)

wherein $R_7$ represents an alkyl group having 1 to 4 carbon atoms; A represents an alkylene group having 2 to 4 carbon atoms; s and t, which may be the same or different, each represent an integer of 1 or more; and the sum of s and t averages 2 to 10.

6. The aqueous ink for ink-jet printing according to claim 1, wherein the at least one compound is an amino acid or a salt thereof.

7. The aqueous ink for ink-jet printing according to claim 6, wherein the amino acid or a salt thereof is β-alanine, proline, γ-aminobutyric acid, arginine, or glycine.

8. The aqueous ink for ink-jet printing according to claim 7, wherein the amino acid or a salt thereof is β-alanine, γ-aminobutyric acid, arginine, or proline.

9. The aqueous ink for ink-jet printing according to claim 1, wherein the at least one compound is the compound represented by formula (1).

10. The aqueous ink for ink-jet printing according to claim 9, wherein the compound of formula (1) is N-methylglycine, N,N-dimethylglycine, N-ethylglycine, N-acetylglycine, or glycylglycine.

11. The aqueous ink for ink-jet printing according to claim 10, wherein the compound of formula (1) is N-methylglycine.

12. The aqueous ink for ink-jet printing according to claim 1, wherein the at least one compound is the compound represented by formula (2).

13. The aqueous ink for ink-jet printing according to claim 12, wherein the compound of formula (2) is N,N,N-trimethylglycine, α-propiobetaine, or γ-butyrobetaine.

14. The aqueous ink for ink-jet printing according to claim 13, wherein the compound of formula (2) is N,N,N-trimethylglycine.

* * * * *